(12) United States Patent
Wittmaak et al.

(10) Patent No.: US 11,814,164 B1
(45) Date of Patent: Nov. 14, 2023

(54) ACTIVE BLADE-PITCH CHANGE SYSTEMS AND METHODS

(71) Applicant: Textron Innovations Inc., Providence, RI (US)

(72) Inventors: John Robert Wittmaak, Newark, TX (US); Alan Hisashi Steinert, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/729,646

(22) Filed: Apr. 26, 2022

(51) Int. Cl.
*B64C 29/00* (2006.01)
*B64C 11/30* (2006.01)
*B64D 27/24* (2006.01)

(52) U.S. Cl.
CPC ........ *B64C 29/0033* (2013.01); *B64C 11/301* (2013.01); *B64C 11/305* (2013.01); *B64D 27/24* (2013.01)

(58) Field of Classification Search
CPC ............ B64C 29/0008; B64C 29/0016; B64C 29/0025; B64C 29/0033; B64C 11/30; B64C 11/301; B64C 11/305; B64C 11/306; B64C 11/44; B64D 27/24; B64D 31/06
See application file for complete search history.

(56) References Cited

U.S. PATENT DOCUMENTS

| | | | | |
|---|---|---|---|---|
| 4,347,997 A | * | 9/1982 | Byham | B64C 27/82 416/123 |
| 6,986,688 B1 | * | 1/2006 | Jansen | B63H 21/17 440/6 |
| 2006/0192046 A1 | * | 8/2006 | Heath | B64C 15/14 244/12.3 |
| 2016/0083077 A1 | * | 3/2016 | Rawdon | B64C 11/06 29/889.6 |
| 2018/0155015 A1 | * | 6/2018 | Thompson | B64C 27/008 |
| 2020/0391847 A1 | | 12/2020 | Fenny et al. | |

OTHER PUBLICATIONS

'Control Theory'. Wikipedia [online]. 2020, [retrieved on Nov. 9, 2022]. Retrieved from the Internet: <URL:https://web.archive.org/web/20201223011027/https://en.wikipedia.org/wiki/Control_theory> (Year: 2020).*
'Control Theory'. Wikipedia [online]. 2020, [retrieved on Feb. 18, 2023]. Retrieved from the Internet: <URL:https://web.archive.org/web/20201223011027/https://en.wikipedia.org/wiki/Control_theory> (Year: 2020).*
Wittmaak, John Robert et al.; "Actuated Blade-Pitch Change Mechanisms"; U.S. Appl. No. 17/890,063, filed Aug. 17, 2022; 40 pages.

* cited by examiner

*Primary Examiner* — Brian P Wolcott
*Assistant Examiner* — Elton K Wong
(74) *Attorney, Agent, or Firm* — Bradley Arant Boult Cummings LLP

(57) ABSTRACT

A method of verifying operation of an aircraft in a predefined flight mode includes operating the aircraft in a first flight mode, commanding the aircraft to transition to a second flight mode, evaluating a plurality of motor performance parameters, and based on values of the plurality of motor performance parameters, determining whether the aircraft has successfully transitioned to the second flight mode.

11 Claims, 3 Drawing Sheets

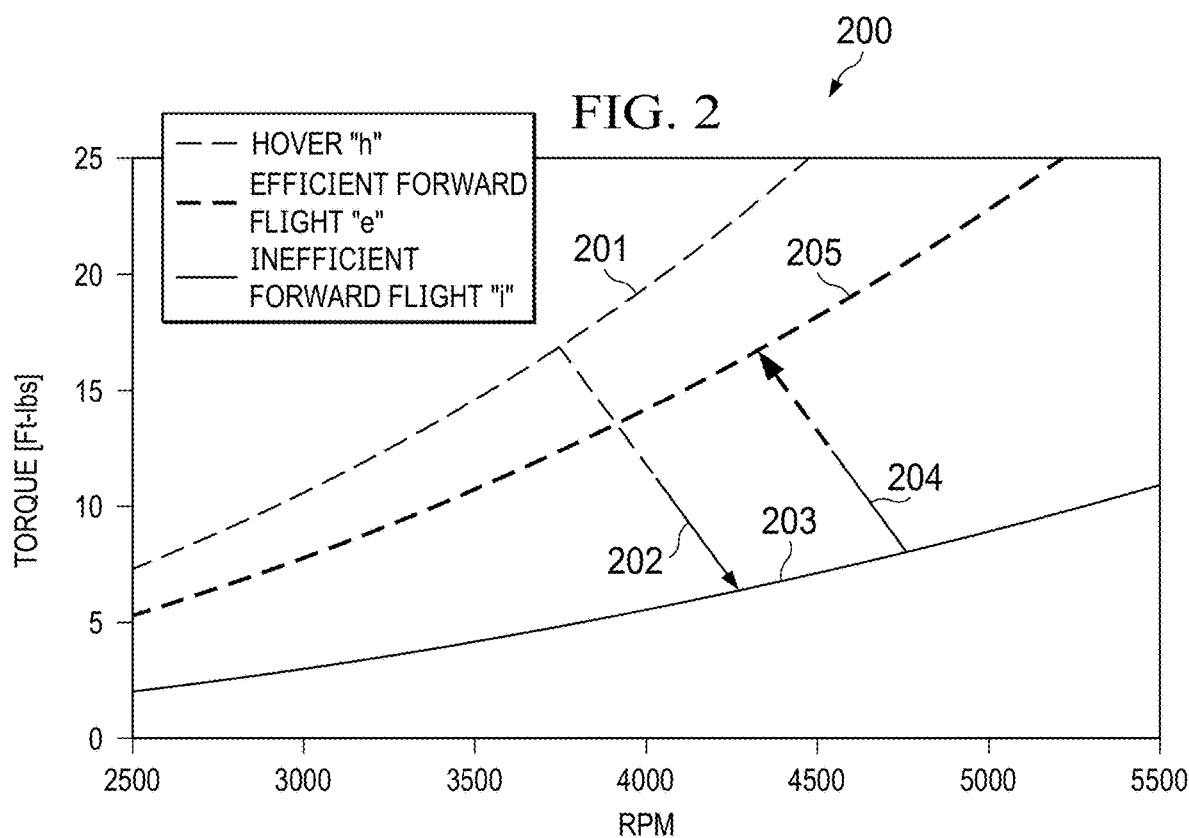
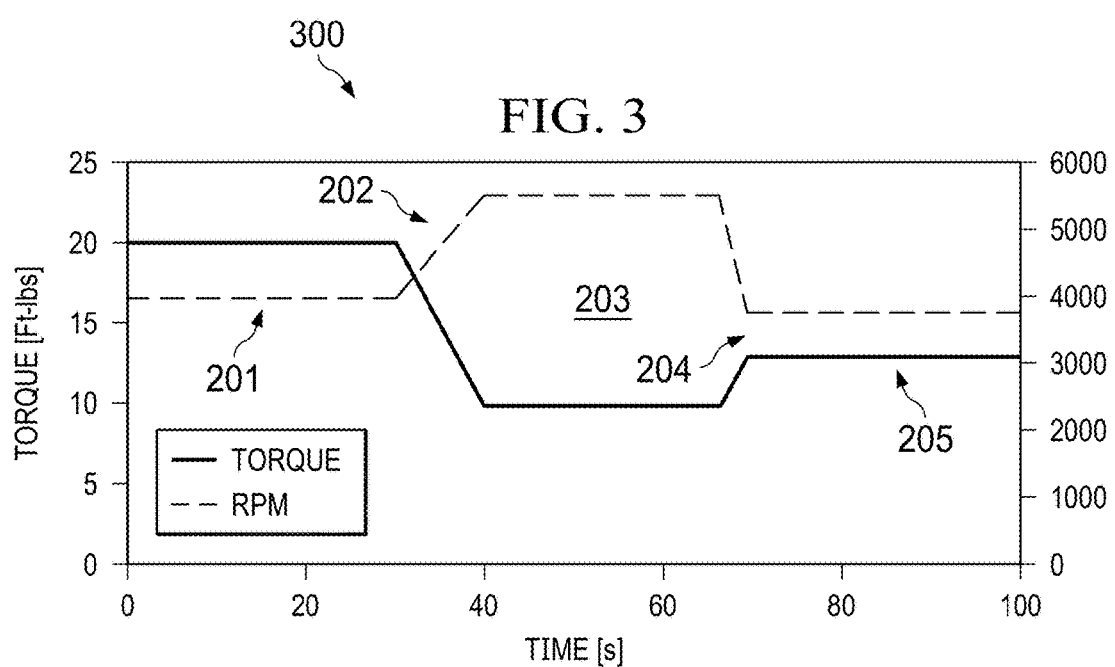

ACTIVE BLADE-PITCH CHANGE SYSTEMS AND METHODS

TECHNICAL FIELD

This disclosure relates in general to the field of rotor-blade pitch-change systems and methods, and more particularly, but not by way of limitation, to rotor-blade pitch-change systems and methods in multi-rotor aircraft.

BACKGROUND

This section provides background information to facilitate a better understanding of the various aspects of the disclosure. It should be understood that the statements in this section of this document are to be read in this light, and not as admissions of prior art.

Variable-speed control systems such as those used on multi-rotor aircraft may benefit from rotor blade-pitch changes for operation under different operating environments or flight regimes (e.g., cruise or forward-flight mode vs. hover mode). Such systems are preferably affordable and simple. Monitoring and verification of commanded pitch changes would be desirable, because the addition of components such as sensors and wiring would increase cost and weight and could reduce reliability.

SUMMARY

A method of verifying operation of an aircraft in a pre-defined flight mode includes operating the aircraft in a first flight mode, commanding the aircraft to transition to a second flight mode, evaluating a plurality of motor performance parameters, and based on values of the plurality of motor performance parameters, determining whether the aircraft has successfully transitioned to the second flight mode.

A method of verifying operation of an aircraft in a pre-defined flight mode includes operating the aircraft in hover mode, commanding the aircraft to transition to forward-flight mode, evaluating a plurality of motor performance parameters comprising motor speed, and based on values of the plurality of motor performance parameters, determining whether the aircraft has successfully transitioned to the forward-flight mode.

A computer-program product includes a non-transitory computer-usable medium having computer-readable program code embodied therein, the computer-readable program code adapted to be executed to implement a method of verifying operation of an aircraft in a pre-defined flight mode. The method includes commanding the aircraft, while in hover mode, to transition to forward-flight mode, evaluating a plurality of motor performance parameters comprising motor speed, and based on values of the plurality of motor performance parameters, determining whether the aircraft has successfully transitioned to the forward-flight mode.

This summary is provided to introduce a selection of concepts that are further described below in the Detailed Description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following Detailed Description when read with the accompanying Figures. It is emphasized that, in accordance with standard practice in the industry, various features are not necessarily drawn to scale. In fact, the dimensions of various features may be arbitrarily increased or reduced for clarity of discussion.

FIG. 2 illustrates a process via a graph of motor torque as a function of motor speed according to one or more aspects of the disclosure;

FIG. 3 illustrates a graph of motor torque and motor speed as a function of time in response to the process 200 of FIG. 2 according to one or more aspects of the disclosure.

DETAILED DESCRIPTION

Figure 1:
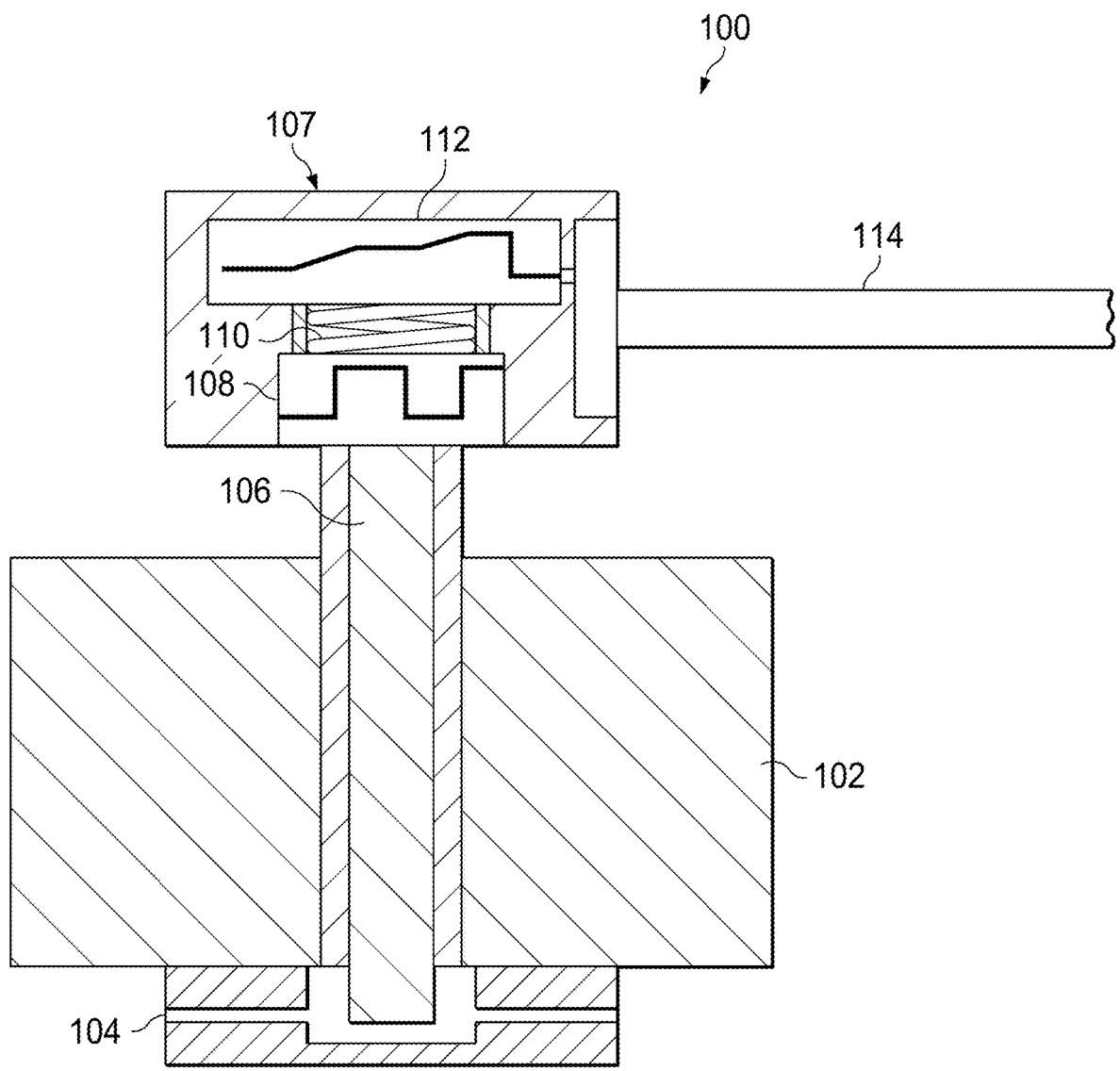
FIG. 1 is a schematic partial view of a rotor system according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a Figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following Detailed Description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Many multi-rotor aircraft, including unmanned logistics aircraft, utilize electric motors and achieve primary attitude control via in-flight differential thrust of multiple rotors of the multi-rotor aircraft. In a typical case, when variable motor speeds are employed to control such an aircraft, collective or cyclic pitch of rotor blades of the aircraft are not utilized. Such aircraft tend to be simpler and have lower manufacturing and maintenance costs relative to similar aircraft that include mechanisms for collective or cyclic rotor-blade pitch control.

While multi-rotor aircraft with fixed-pitch rotor blades often exhibit improved reliability, lower manufacturing cost, and lower maintenance cost, performance tradeoffs often must be accepted. Fixed rotor-blade-pitch aircraft often have a preferred blade-pitch position for hover. When the aircraft is in forward flight, such that there is an inflow of air, more blade pitch relative to the preferred hover blade-pitch position is typically necessary in order to keep a motor that drives the rotor within its operating speed (i.e., RPM) range. Such a forward-flight mode is often referred to as cruise mode. The ability to change collective pitch would increase cruise efficiency of the aircraft; however, the ability to change collective pitch could require additional mechanisms that would increase the complexity of the aircraft. Those having skill in the art will also appreciate that a rotor blade can be designed that performs reasonably well in both hover and forward-flight conditions, but such an approach would likely result in unavoidable tradeoffs.

FIG. 1 is a schematic partial view of a rotor system 100. The rotor system 100 includes a motor 102. The motor 102 is typically an electric motor. The motor 102 includes a solenoid clutch 104 and a motor mast 106. The motor mast 106 is rotationally driven by the motor 102. A hub 107 is operably and rotatably connected to the motor 102 via the motor mast 106. The hub 107 includes a rotation-limit track 108, a spring 110, and a blade-pitch track 112. The spring 110 connects the rotation-limit track 108 and the blade-pitch track 112. The hub 107 is connected to a rotor blade 114 and serves to rotate the rotor blade 114 in response to rotation of the motor mast 106 in response to torque generated by the motor 102. Those having skill in the art will appreciate that a typical rotor system will include a rotor including a plurality of rotor blades and a typical multi-rotor aircraft will include a plurality of rotors.

In the rotor system 100, the solenoid clutch 104 does not drive components of the rotor system 100 but rather serves to induce drag. In particular, the solenoid clutch 104 serves to pull components together electromagnetically for a short amount of time. The solenoid clutch 104 rotates relative to non-rotating components of the motor 102, which results in friction therebetween. As a result, a torque is applied to the motor mast 106. Torque applied to the motor mast 106 is transmitted to the rotation-limit track 108. The rotation-limit track 108 includes a gated track such that a pin makes its way along a groove based on up-and-down movement in response to the torque applied thereto.

In a typical embodiment, the rotation-limit track 108 can only increment one step at a time along the gated track. The rotor blade 114 is attached to the blade-pitch track 112. The blade-pitch track includes a cam follower that causes pitch of the rotor blade 114 to change in an incremental stepwise fashion responsive to engagement of the solenoid clutch 104. Thus, an actuated system allows changes in blade pitch to occur without unnecessary complexity.

In a typical embodiment, two or three fixed blade pitches are possible. However, in some states, the rotor system 100 could fail to change to a new commanded blade-rotor pitch state as desired. In such a case, the failure should be detected. Detection of rotor blade-pitch change failures without sensors to perform the detection function would avoid the need for additional complexity and cost.

Responsive to actuation of the solenoid clutch 104 to change the rotor-blade pitch, a process is used to perform a detection function to verify that the rotor-blade pitch has changed as expected. In a typical failure to change rotor-blade pitch as expected, all of the rotor blades on a single rotor would be expected all change pitch together or none to change pitch.

A process described herein can be applicable, but not necessarily limited, to any rotor aircraft that uses a direct drive motor such as an electric motor. In some embodiments, an electric motor is controlled by a processor that actively controls the motor. In these embodiments, the process can be employed without the need to add any hardware to the aircraft.

FIG. 2 illustrates a process 200 via a graph of motor torque as a function of motor speed. The process 200 includes states 201-205 relative to three curves, namely, a hover ("h") curve, an efficient-forward-flight ("e") curve, and an inefficient-forward-flight ("i") curve. Although each of the h, e, and i curves is shown as a distinct curve relative to motor torque and motor speed (i.e., RPM), it will be understood that in a typical case each of the curves would be a band of values of torque and speed within which the particular state is considered to be present. The values of motor torque and motor speed shown are for illustrative purposes and will be understood to vary depending on characteristics of different aircraft to which the process 200 may be applied. The process 200 may be employed on a system such as the rotor system 100 and will be described relative to the rotor system 100; however, the process 200 may be employed on other systems as well. The process 200 is used to detect and confirm rotor-blade pitch changes have been made as expected. Although FIG. 2 illustrates a two-state process, a process with more than two states could be employed without departing from the principles discussed herein.

The process 200 begins at state 201 on curve h, which represents the aircraft in a stable hover state based on a known motor torque-speed relationship. Responsive to a command to transition to forward flight and change to a rotor-blade pitch more suitable for forward flight, the motor 102 increases its speed, which results in an increase in RPM, and torque of the motor 102 decreases. If the rotor-blade pitch has changed as expected to a rotor-blade pitch more suitable for forward flight, state 202 would result in the torque-speed curve to converge on curve e, which, as indicated above, is indicative of efficient forward flight. If operation continues on curve e, no further action is necessary.

However, if state 202 shows a continuing decrease in torque and concurrent increase in speed as shown in process 200, once the torque and speed progress past the curve e, such progress is indicative inefficient forward flight, which is often a state in which torque is low and speed is high. Inefficient forward flight is indicative of a failure to change the rotor-blade pitch as expected. The curve i is, as noted above, an inefficient forward-flight curve.

In state 203, the rotor torque and speed both increase along the curve i. In state 203, upon detection of operation outside of the curve e, a determination is made that operation on curve e is not occurring as expected. Curve i is illustrative in nature. It will be understood that any curve outside of curve e would be indicative of a failure to change blade pitch as expected.

In response to the determination that operation on curve e has not occurred, a command to change to the correct rotor-blade pitch is made in order to attempt to achieve the desired rotor-blade pitch for forward flight. If the desired rotor-blade pitch is achieved, state 204 is entered into, such that both torque and speed decrease until operation is on curve e. From state 204, operation proceeds on curve e, on which curve efficient forward flight continues and it is determined that the expected rotor blade-pitch change has occurred. It is therefore apparent that successful rotor-blade pitch changes can be detected without the need for sensors.

FIG. 3 illustrates a graph of motor torque and motor speed as a function of time in response to the process 200 of FIG. 2. At time 0 s, in the state 201, operation is on the hover curve h, in which motor torque and motor speed are at constant values of ~16 ft-lbs and 5,000 RPM. At time ~30 s, a command to transition to forward flight and change the rotor-blade pitch is made such that state 202 is entered into, responsive to which command motor speed increases to ~6,600 RPM and motor torque decreases to ~10 ft-lbs. In the example shown in FIG. 3, such values are known to be outside curve e of FIG. 2; therefore, upon detection of such off-curve performance while operation is in state 203, a command is change to the correct rotor-blade pitch is made in order to attempt to achieve the desired rotor-blade pitch for forward flight. If the desired rotor-blade pitch is achieved, state 204 is entered into, such that both torque and speed decrease until operation is on curve e. Torque while in state 204 transitions to ~12 ft-lbs and speed transitions to ~3,900 RPM. From state 204, operation proceeds on curve e, on which curve efficient forward flight continues.

In some embodiments, torque may be determined, for example, as a function of current. The torque can be measured directly or derived from known values such as, for example, current, voltage, power, and airspeed. In addition, if the rotor of a given aircraft is well-known and well-understood, given known air speed and rotor RPM, torque can be determined via, for example, a lookup table or other test data. Torque can be solved for using current in order to check for a mismatch. Such a process allows bands of expected performance to be determined, outside of which is indicative of an error state.

In some embodiments, RPM is a measured term output from the motor. Torque may or may not be a directly measured value; however, in a case in which torque is not directly measured, the motor may, for example, output a current value, from which torque can be determined. Some motors do not directly measure torque but instead calculate torque using, for example, voltage and current based on specifications and test data of the motor. In some embodiments, a table may be used that, based on a particular airspeed, states that a certain amount of drag is present; therefore, a certain amount of thrust is present. With that information, RPM in order to produce the proper amount of thrust at that airspeed can be derived.

In some multi-rotor aircraft embodiments, if all rotors are commanded at the same time and it is detected that one or more of the rotors did not change pitch is expected, all rotors could be commanded to step back to a state they were in at the time of the original command so that, for example, the process 200 could be initiated again.

Depending upon the control scheme of the motor, either torque or RPM, for example, can be maintained by a control system of the aircraft. Other downstream control parameters are also possible, such as, for example, targeting a particular power (i.e., torque mode) for a certain desired airspeed (i.e., RPM mode) or altitude. If, for example, RPM mode is used, torque will increase in response to increased load in order to maintain RPM. In similar fashion, in torque mode, a motor could torque balance by adjusting RPM in response to input load on the motor in order to match a target torque value.

Figure 4:
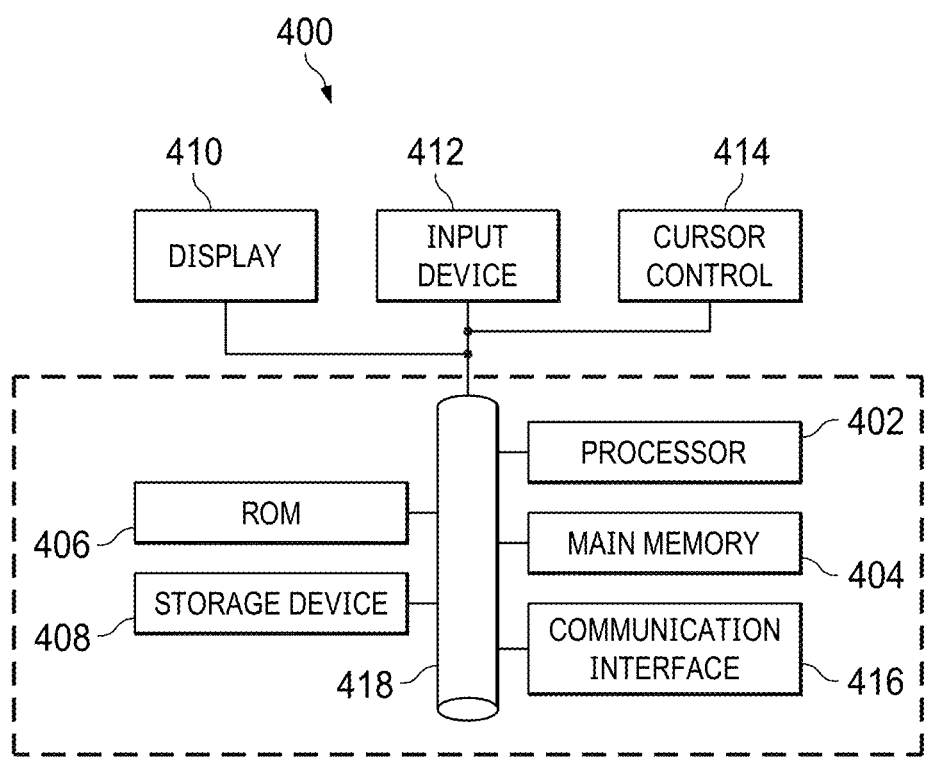
FIG. 4 illustrates an embodiment of a computer system on which various processes described herein can be implemented.

FIG. 4 illustrates an embodiment of a computer system 400 on which various processes described herein can be implemented. The computer system 400 may be a physical system, virtual system, or a combination of both physical and virtual systems. In the implementation, the computer system 400 may include a bus 418 or other communication mechanism for communicating information and a processor 402 coupled to the bus 418 for processing information. The computer system 400 also includes a main memory 404, such as random-access memory (RAM) or other dynamic storage device, coupled to the bus 418 for storing computer readable instructions by the processor 402.

The main memory 404 also may be used for storing temporary variables or other intermediate information during execution of the instructions to be executed by the processor 402. The computer system 400 further includes a read-only memory (ROM) 406 or other static storage device coupled to the bus 418 for storing static information and instructions for the processor 402. A computer-readable storage device 408, such as a magnetic disk or optical disk, is coupled to the bus 418 for storing information and instructions for the processor 402. The computer system 400 may be coupled via the bus 418 to a display 410, such as a liquid crystal display (LCD) or a cathode ray tube (CRT), for displaying information to a user. An input device 412, including, for example, alphanumeric and other keys, is coupled to the bus 418 for communicating information and command selections to the processor 402. Another type of user input device is a cursor control 414, such as a mouse, a trackball, or cursor direction keys for communicating direct information and command selections to the processor 402 and for controlling cursor movement on the display 410. The cursor control 414 typically has two degrees of freedom in two axes, a first axis (e.g., x) and a second axis (e.g., y), that allow the device to specify positions in a plane.

The term "computer readable instructions" as used above refers to any instructions that may be performed by the processor 402 and/or other component of the computer system 400. Similarly, the term "computer readable medium" refers to any non-transitory storage medium that may be used to store the computer readable instructions. Such a medium may take many forms, including, but not limited to, nonvolatile media, volatile media, and transmission media. Non-volatile media include, for example, optical or magnetic disks, such as the storage device 408. Volatile media includes dynamic memory, such as the main memory 404. Transmission media includes coaxial cables, copper wire, and fiber optics, including wires of the bus 418. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

Various forms of the computer readable media may be involved in carrying one or more sequences of one or more instructions to the processor 402 for execution. For example, the instructions may initially be borne on a magnetic disk of a remote computer. The remote computer can load the instructions into its dynamic memory and send the instructions over a telephone line using a modem. A modem local to the computer system 400 can receive the data on the telephone line and use an infrared transmitter to convert the data to an infrared signal. An infrared detector coupled to the bus 418 can receive the data carried in the infrared signal and place the data on the bus 418. The bus 418 carries the data to the main memory 404, from which the processor 402 retrieves and executes the instructions. The instructions received by the main memory 404 may optionally be stored on the storage device 408 either before or after execution by the processor 402.

The computer system 400 may also include a communication interface 416 coupled to the bus 418. The communication interface 416 provides a two-way data communication coupling between the computer system 400 and a network. For example, the communication interface 416 may be an integrated services digital network (ISDN) card or a modem used to provide a data communication connection to a corresponding type of telephone line. As another example, the communication interface 416 may be a local area network (LAN) card used to provide a data communication connection to a compatible LAN. Wireless links may also be implemented. In any such implementation, the communication interface 416 sends and receives electrical, electromagnetic, optical, or other signals that carry digital data streams representing various types of information. The storage device 408 can further include instructions for carrying out various processes for image processing as described herein when executed by the processor 402. The storage device 408 can further include a database for storing data relative to same.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as inboard, outboard, above, below, upper, lower, or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term comprising within the claims is intended to mean including at least such that the recited listing of elements in a claim are an open group. The terms a, an and other singular terms are intended to include the plural forms thereof unless specifically excluded.

What is claimed is:

1. A method of verifying operation of an aircraft in a pre-defined flight mode, the method comprising:
   operating the aircraft in a first flight mode, the first flight mode being characterized by a first band of values of motor torque and motor speed;
   commanding the aircraft to transition to a second flight mode, the second flight mode being characterized by a second band of values of the motor torque and the motor speed;
   determining the motor torque and the motor speed;
   responsive to a determination that the motor torque and the motor speed are within the second band, determining that the aircraft has successfully transitioned to the second flight mode; and
   responsive to a determination that the motor torque and the motor speed are not within the second band, determining that the aircraft has not successfully transitioned to the second flight mode.

2. The method of claim 1, wherein the first flight mode is hover mode.

3. The method of claim 1, wherein:
   the motor torque is derived from at least one of motor current, motor voltage, and airspeed of the aircraft.

4. The method of claim 1, wherein:
   the aircraft comprises a rotor system comprising a rotor operable in a plurality of rotor-blade-pitch positions;
   the first flight mode is hover mode;
   the second flight mode is forward-flight mode;
   a first rotor-blade-pitch position of the plurality of rotor-blade-pitch positions corresponds to the first flight mode; and
   a second rotor-blade-pitch position of the plurality of rotor-blade-pitch positions corresponds to the second flight mode.

5. The method of claim 1, wherein:
   the motor torque when the aircraft is operating in the second flight mode is less than the first motor torque when the aircraft is operating in the first flight mode; and
   the motor speed when the aircraft is operating in the second flight mode is greater than the motor speed when the aircraft is operating in the first flight mode.

6. A method of verifying operation of an aircraft in a pre-defined flight mode, the method comprising:
   operating the aircraft in hover mode, the hover mode being characterized by a first band of values of motor torque and motor speed;
   commanding the aircraft to transition to forward-flight mode, the forward-flight mode being characterized by a second band of values of motor torque and motor speed;
   determining the motor torque and the motor speed;
   responsive to a determination that the motor torque and the motor speed are within the second band, determining that the aircraft has successfully transitioned to the forward-flight mode; and
   responsive to a determination that the motor torque and the motor speed are not within the second band, determining that the aircraft has not successfully transitioned to the forward-flight mode.

7. The method of claim 6, wherein:
   the motor torque is derived from at least one of motor current, motor voltage, and airspeed of the aircraft.

8. The method of claim 6, wherein:
   the motor torque when the aircraft is operating in the forward-flight mode is less than the motor torque the aircraft is operating in the hover mode; and
   the motor speed when the aircraft is operating in the forward-flight mode is greater than the motor speed when the aircraft is operating in the hover mode.

9. The method of claim 6, wherein:
   the aircraft comprises a rotor system comprising a rotor operable in a plurality of rotor-blade-pitch positions;
   a first rotor-blade-pitch position of the plurality of rotor-blade-pitch positions corresponds to the hover mode; and
   a second rotor-blade-pitch position of the plurality of rotor-blade-pitch positions corresponds to the forward-flight mode.

10. A computer-program product comprising a non-transitory computer-usable medium having computer-readable program code embodied therein, the computer-readable program code adapted to be executed to implement a method of verifying operation of an aircraft in a pre-defined flight mode, the method comprising:
    commanding the aircraft, while in hover mode, to transition to forward-flight mode, wherein the hover mode is characterized by a first band of values of motor torque and motor speed and the forward-flight mode is characterized by a second band of values of motor torque and motor speed;

responsive to a determination that the motor torque and the motor speed are within the second band, determining that the aircraft has successfully transitioned to the forward-flight mode; and responsive to a determination that the motor torque and the motor speed are not within the second band, determining that the aircraft has not successfully transitioned to the forward-flight mode.

11. The computer-program product of claim 10, wherein the motor torque is derived from at least one of motor current, motor voltage, and airspeed of the aircraft.

* * * * *